May 3, 1966  H. LEMAIRE ETAL  3,249,856
MAGNETOMETERS FOR MEASURING THE EARTH MAGNETIC
FIELD AND ITS VARIATIONS
Filed Dec. 27, 1963  2 Sheets-Sheet 2
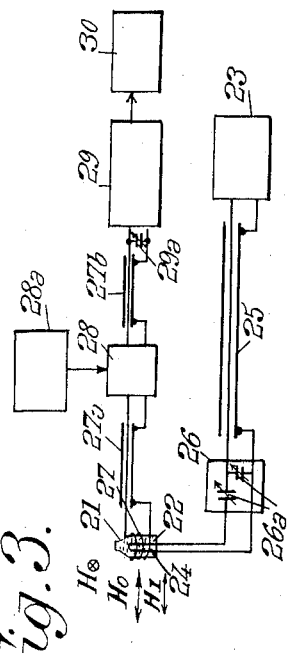
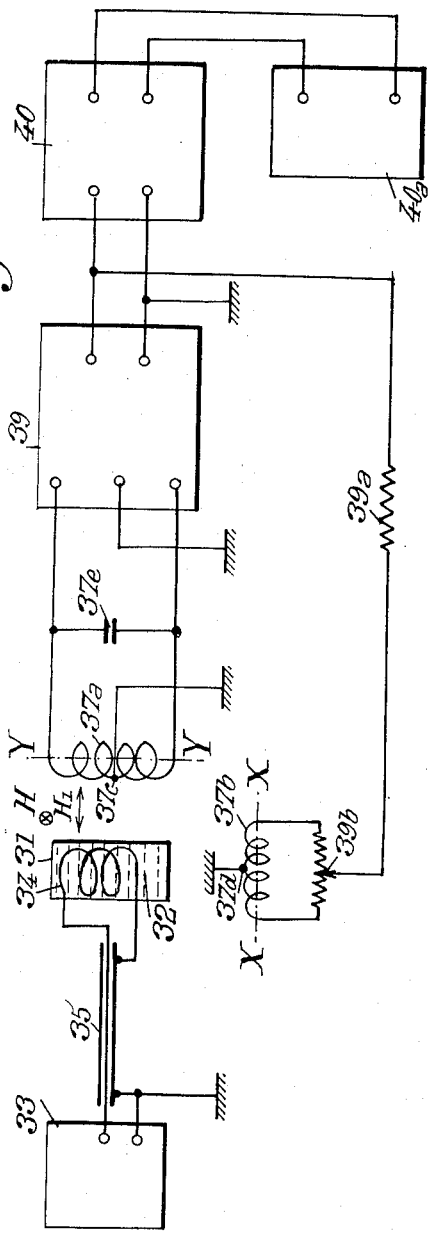

United States Patent Office 3,249,856
Patented May 3, 1966

3,249,856
MAGNETOMETERS FOR MEASURING THE EARTH MAGNETIC FIELD AND ITS VARIATIONS
Henri Lemaire and André Rassat, Grenoble, Antoine Salvi, Fontaine, and Roselyne Briere, nee Le Fevre, and Rose-Marie Dupeyre, Grenoble, France, assignors to Commissariat a l'Energie Atomique, Paris, France, an organization of France
Filed Dec. 27, 1963, Ser. No. 333,901
Claims priority, application France, Dec. 28, 1962, 920,081; May 24, 1963, 935,904; Sept. 4, 1963, 946,486; Sept. 13, 1963, 947,459; Sept. 16, 1963, 947,629
23 Claims. (Cl. 324—.5)

The present invention relates to methods for the dynamic polarization of the atomic nuclei of a solvent (in particular of the protons of a hydrogenated solvent), that is to say for the compelled orientation of the magnetic moments of said nuclei (or protons) and more particularly for the dynamic polarization of said atomic nuclei by means of a second ensemble of atomic particles, dissolved in said solvent and coupled with the atomic nuclei of the solvent, excitation of the magnetic resonance of these particles having for its effect to increase, due to coupling, the magnetic polarization of said atomic nuclei.

The invention is also concerned with magnetometers for measuring the intensity of low magnetic fields (generally lower than 10 gauss), in particular of the earth magnetic field and its variations, such magnetometers bringing into play the new dynamic polarization methods above referred to.

As a matter of fact, there are known magnetometers for measuring such magnetic fields which bring into play a solution containing, on the one hand, a solvent (generally a hydrogenated one) with magnetic nuclei (such as protons) having a magnetic moment and an angular momentum both different from zero (that is to say nuclei with a gyromagnetic ratio which is well determined and different from zero), and, on the other hand, dissolved in this solvent, a paramagnetic substance consisting of a free radical having a fixed hyperfine spectral structure, that is to say having in a low value field and even, at limit conditions, in a zero field, an energy gap or energy splitting different from zero between two possible energy levels. Such substances have, in their molecule, an unpaired electron permitting, by coupling of this electron with the nuclei (generally protons) of the solvent, dynamic polarization thereof.

In such magnetometers, the application of a magnetic field alternating (or rotating) at the electronic resonance frequency of the unpaired electron paramagnetic substance, in the magnetic field to be measured—that is to say at the frequency corresponding according to the following formula:

$$\text{frequency} = \frac{\text{energy}}{\text{Planck's constant}}$$

to the hyperfine energy gap in the magnetic field to be measured—with an intensity sufficient to saturate an electronic resonance line, has for its effect, due to dipolar coupling between the unpaired electrons of the free radical and the atomic nuclei of the solvent, to impart a quantic transition to the energy of a portion of these nuclei which is thus polarized in a direction different from that it would have in the absence of the saturation magnetic field.

Thus, there is obtained a dynamic polarization of the atomic nuclei of the solvent, which has essentially for its effect to increase the intensity of the nuclear resonance signal (of the nuclei of the solvent), that is to say of the signal at the frequency of resonance of the nuclei of the solvent in the magnetic field to be measured (which frequency is exactly proportional to the intensity of the field to be measured, because this frequency F is equal, in cycles per second, to the intensity H of this field in gauss multiplied by a well determined constant factor which depends solely upon the nature of the atomic nuclei, and which is equal to the quotient of the gyromagnetic ratio $\gamma$ of these nuclei by $2\pi$, so that $$F = \frac{\gamma}{2\pi} \cdot H$$

$\gamma$ being given by tables). Now, it is known that the intensity of this signal at frequency F is very low in low magnetic fields (lower than 10 gauss) and in particular in the earth magnetic field, in the absence of dynamic polarization. Thus, dynamic polarization of the atomic nuclei of a solvent has essentially for its purpose to permit accurate measurement of the intensity of low magnetic fields.

Up to the present time, use was made (in the state of dissolution in a solvent comprising atomic nuclei of magnetic moment and angular momentum both different from zero) as free radicals having a hyperfine spectral structure of fixed type—that is to say comprising in their molecule an unpaired electron strongly coupled with an atomic nucleus (or possibly several atomic nuclei) of the molecule, which has, or have, a magnetic moment and an angular momentum both different from zero— of the following radicals:

The diphenyl-picryl-hydrozyl radical or ion (abbreviated as DPPH), which unfortunately has the drawback of including in its molecule a great number of protons coupled with the unpaired electron; there follows a very complicated hyperfine structure of the spectrum of DPPH by coupling between said electron and said protons, which makes it difficult to obtain an efficient saturation of a single electronic resonance line;

The peroxylamine disulfonate $NO(SO_3)_2$ radical or ion, in which the unpaired electron is coupled with the single nitrogen nucleus, which give it a simple hyperfine structure, easy to saturate; unfortunately, if this ion is more advantageous from this point of view than DPPH, it has the drawback of being little stable when in solution in water, especially if the temperature is above 30°–40° C., even if the aqueous solution is strongly deoxygenated, deoxygenation having besides for its effect not only to increase stability, but also to reduce the width of the electronic resonance line, which facilitates an efficient and selective saturation of only one of these lines;

Picryl-aminocarbazyl;
Semiquinones.

Now, we have found a new kind of free radicals which are perfectly stable for dynamic polarization of the nuclei of a solvent, in particular of an aqueous and/or organic hydrogenated solvent, in particular in magnetometers for measuring the intensity of low magnetic fields, especially of the earth magnetic field. This kind consists of ditertiobutylnitroxide and its derivatives, that is to say the compounds comprising a nitroxide group with, linked to the nitrogen atom of this group, exclusively two tertiary carbon atoms (i.e. two carbon atoms each linked to three other carbon atoms). The general formula of these compounds is as follows:

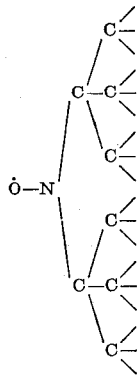

By way of non-limitative examples of ditertiobutylnitroxides within the scope of the invention, we may cite the following compounds which have been actually prepared and tested by us:

Ditertiobutylnitroxide proper, the formula of which is:

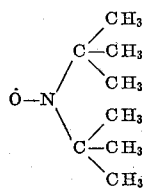

Triacetoneamine nitroxide, or tetramethyl-2-2-6-6-aza-1-cyclohexanone-nitroxide-1, the formula of which is:

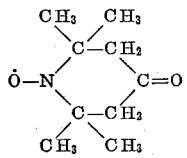

Organic free radicals having a pentagonal heterocycle the heteroatom of which is nitrogen and is linked, on the one hand, to an oxygen atom, with which it forms a nitroxide group and, on the other hand, exclusively with the two carbon atoms that are adjacent thereto in the pentagonal cycle, each of these two carbon atoms being on the other hand linked to the three other carbon atoms, that is to say radicals of the following formula:

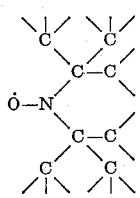

such as tetramethyl-2-2-5-5-aza-1-cyclopentene-3-carboxamide-3-oxide-1, tetramethyl-2-2-5-5-aza-1-cyclopentane-3-oxide-1, tetramethyl-2-2-5-5-aza-1-cyclopentanol-3-oxide-1, tetramethyl-2-2-5-5-aza-1-cyclopentanone-3-oxide-1, the formulas of which radicals will be given hereinafter;

Organic free radicals having an hexagonal heterocycle, the heteroatom of which is nitrogen and is linked, on the one hand, with an oxygen atom with which it forms a nitroxide group and, on the other hand, exclusively with two carbon atoms, that are adjacent thereto in the hexagonal cycle, each of these two carbon atoms being, on the other hand, linked to two methyl groups, that is to say radicals of the following formula:

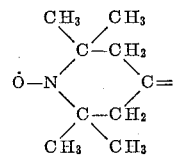

such as triacetoneamine nitroxide already cited, tetramethyl-2-2-6-6-aza-1-cyclo-hexanol-4-oxide-1, tetramethyl-2-2-6-6-aza-1-cyclo-hexane-4-oxide-1, and tetramethyl-2-2-6-6-aza-1-cyclohexanoneoxime-4-oxide-1, the formulas of which will be given hereinafter.

The present invention therefore has for its object a method of dynamic polarization of the atomic nuclei, having a magnetic moment and an angular momentum both different from zero, of a solvent, generally hydrogenated, which consists in dissolving in this solvent a free radical, having an unpaired electron, of hyperfine spectral structure, with at least one electronic resonance line of non-zero frequency in a zero magnetic field, and in saturating such an electronic resonance line of this free radical, characterized in that said free radical comprises a nitroxide group the nitrogen atom of which is connected, on the other hand, exclusively with two carbon atoms each linked to three other carbon atoms.

The invention also has for its object a magnetometer for measuring the intensity of low magnetic fields (lower than about 10 gauss), in particular the earth magnetic field, comprising a vessel which contains, on the one hand, a solvent with magnetic nuclei having a magnetic moment and an angular momentum both different from zero (that is to say having a well defined gyromagnetic ratio) and, on the other hand, dissolved in this solvent, a free radical with an unpaired electron, having a hyperfine structure with at least one electronic resonance line of non-zero frequency in a zero magnetic field, saturation means for saturating such an electronic resonance line in the magnetic field to be measured, and means for determining the nuclear resonance frequency of the said atomic nuclei in the magnetic field to be measured when said saturation means actually saturate said electronic resonance line, this nuclear resonance frequency being exactly proportional to the intensity of the magnetic field, characterized by the fact that said free radical comprises a nitroxide group the nitrogen atom of which is, on the other hand, linked exclusively to two carbon atoms each linked to three other carbon atoms.

The means for determining the nuclear resonance frequency may be of different types and, concerning this point, we chiefly distinguish the following types of magnetometers for carrying out the invention:

Magnetometers of the absorption type wherein, during the determination, the atomic nuclei of the solvent absorb energy when passing from a lower energy level to a higher energy level, the separation between the two levels or states corresponding to the nuclear resonance frequency, which is proportional to the magnetic field intensity; we then measure the resonance frequency for which the absorption is maximum;

Magnetometers of the emission type, in particular of the maser type, wherein, due to the dipolar coupling between the unpaired electrons of the radical and the atomic nuclei of the solvent, saturation of an electronic resonance line of the paramagnetic radical causes the stimulated emission of energy by the nuclei of the solvent at nuclear resonance frequency; it suffices to collect this energy in an oscillatory circuit, tuned to the frequency of this energy and having a very high noise figure, and to determine the frequency of the oscillations in this circuit;

Nuclear induction magnetometers wherein the measurement includes two steps, to wit, a first step during which there is applied an auxiliary magnetic field, generally unidirectional and substantially perpendicular to the direction of the magnetic field to be measured so as to give the atomic nuclei substantially the direction of the auxiliary magnetic field, saturation of an electronic resonance line of the dissolved radical also having for its effect to ensure, due to the coupling between the electrons of the radical and the nuclei of the solvent, polarization of the latter, and a second step during which, after sudden cancellation of the auxiliary magnetic field, the atomic nuclei or spins are allowed to have a free precession movement about the magnetic field to be measured at the nuclear resonance frequency or Larmor frequency, and this frequency is measured;

Spin generator magnetometers, wherein there is provided, in addition to the means for saturating the electronic resonance line of the dissolved radical, at least two coils disposed substantially at 90° to each other and uncoupled in the absence of magnetic resonance phenomenons, one of these coils, which acts as the receiver, being connected to the other coil, which acts as the transmitter, through an amplifier having a very high amplification factor, the coupling between the two coils, when magnetic resonance phenomenons appear, producing, in the circuit constituted by the two coils and the amplifier, oscillations at the nuclear resonance frequency; it then suffices to measure the frequency of these oscillations.

The free radicals according to the present invention have the following advantages over the free radicals already used for ensuring dynamic polarization of the atomic nuclei of a solvent, in particular in a magnetometer for measuring low magnetic fields:

As they are wholly organic, they are soluble in most of the organic solvents and in particular in hydrocarbons and in alcohols;

They are very stable from the chemical point of view, in all conditions of use;

They have a hyperfine energy gap, therefore an electronic resonance frequency, in a zero field sufficiently high to obtain an intensive nuclear signal in a low field (it is known that the polarization of atomic nuclei is proportional to this hyperfine energy gap);

The structure of their hyperfine spectrum permits an efficient saturation of the electronic resonance line that is used, and The spins of their unpaired electrons have a dipolar coupling with the spins of the atomic nuclei of the solvent.

Preferred embodiments of our invention will be hereinafter described with reference to the appended drawings, given merely by way of example, and in which:

FIG. 3 shows a nuclear induction magnetometer made according to the invention;

FIG. 4 shows a spin generator magnetometer made according to the invention.

Figure 1:
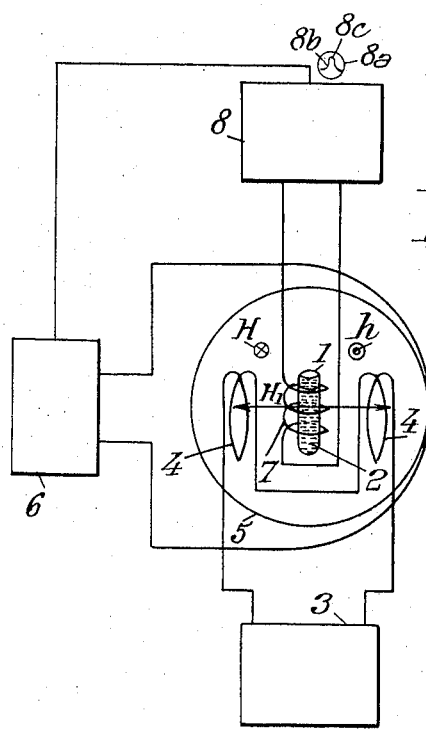
FIG. 1 shows an absorption magnetometer made according to the invention.

FIG. 1 of the appended drawings shows a nuclear absorption and double (both electronic and nuclear) resonance magnetometer of the type described in the United States Patent No. 3,049,662, delivered August 14, 1962, with reference to FIG. 3, but comprising the improvements according to the present invention. Reference may also be made to this patent concerning the nature of the energy gaps and of the resonance frequencies referred to in the description.

In FIG. 1, it has been supposed that the magnetic field to be measured is the earth magnetic field H extending perpendicularly to the plane of this figure from the front toward the rear. A vessel 1 contains a solution 2 consisting of a solvent (generally a hydrogenated one) containing atomic nuclei having a magnetic moment and an angular momentum both different from zero, and of a free radical (dissolved in this solvent), comprising a nitroxide group the nitrogen atom of which is, on the other hand, linked exclusively to two tertiary carbon atoms, that is to say to two carbon atoms each linked to three carbon atoms. Particular examples of such radicals and of suitable solvents will be hereinafter given both for this type of magnetometers and for magnetometers of other types, as illustrated by the other figures. A high frequency oscillator 3 supplies electrical oscillations at a frequency equal to the electronic reconance frequency $f$ of the radical of the solution 2 contained in vessel 1, the values of the electronic resonance frequencies in the earth magnetic field being hereinafter indicated for the free radicals according to the invention given by way of example. Oscillator 3 attacks one or several coils 4 which create, inside vessel 1, and therefore in solution 2, a alternating magnetic field $H_1$ at the frequency of oscillator 3, therefore at an electronic frequency $f$ of the hyperfine structure radical. The power of oscillator 3 must of course be sufficient to permit saturation of this line (by saturation is meant the total passage of the electronic spins from the lower energy level that they normally occupy, in a proportion depending upon the temperature, to the higher energy level, that is to say the complete tipping of the spins). Due to this saturation, the nuclear spins of the solvent (the protons in the case of a hydrogenated solvent) also pass from one energy level to another one. In the case of an absorption magnetometer, the nuclear spins pass from a higher energy level to a lower energy level under the effect of this saturation. Anyway, the difference of population between the upper and lower levels is increased as a consequence of the coupling between the nuclear spins and the electronic spins and of the saturation of the electronic spins.

In the embodiment that is illustrated, measurement of of nuclear resonance frequency, that is to say of the Larmor precession frequency of the nuclear spins is performed by means of a Pound spectrometer 8 working at a low frequency, which averages 2100 cycles per second in the case of a hydrogenated solvent, because the resonance frequency of the protons in the earth magnetic field is about 2100 cycles per second. With such a spectrometer, it is endeavoured to obtain the maximum of absorption (which corresponds to resonance) by sweeping or slowly modulating the intensity of the magnetic field to be measured by means of an auxiliary alternating magnetic field. For this purpose, one or several coils, called Helmholtz coils, fed from a generator or oscillator 6 at industrial frequency (50 or 60 cycles per second), create such an auxiliary field $h$ inside vessel 1, this field $h$ being algebraically added to the field H to be measured to which it is alternately parallel and anti-parallel, respectively.

A coil 7, coupled with the solution 2 of vessel 1, permits of applying to this solution, from spectrometer 8, an energy at a frequency close to the nuclear Larmor frequency. A portion of this energy is absorbed by solution 2 to produce the passage of the atomic nuclei of this solution from a lower energy level to a higher energy level. In spectrometer 8, the maximum of absorption is observed by means of an oscilloscope (the screen of which is shown at 8a, with the absorption curve 8b) with a vertical deflection proportional to the absorption and a horizontal deflection ensured by generator 6 so as to be proportional to $h$. If the maximum takes place at 8c for an auxiliary field $h$ and for a frequency F in spectrometer 8, we have $$F = \frac{\gamma}{2\pi} \times (H+h)$$

which gives the value of H, because spectrometer 8 permits of determining $h$ and the frequency F at resonance, whereas the gyromagnetic ratio is given by tables.

Figure 2:
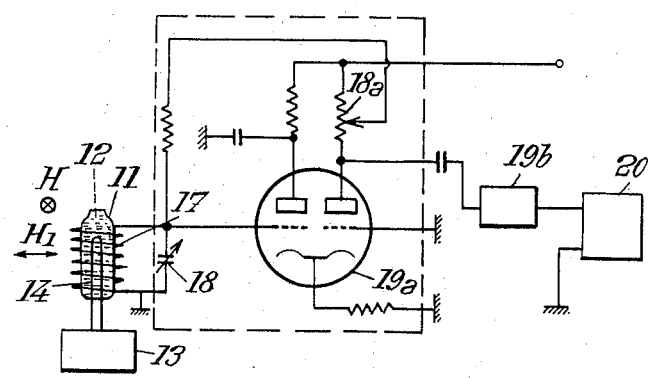
FIG. 2 shows a maser type magnetometer made according to the invention.

In FIG. 2, we have shown a magnetometer of the maser type also described in the above mentioned United States patent, with reference to FIGS. 4 to 6 thereof, that is to say a magnetometer with stimulated emission of energy at the nuclear resonance frequency (Larmor frequency of the atomic nuclei of the solvent). In this case also, H is the magnetic field to be measured, in particular the earth magnetic field. In this embodiment, as in the one of FIG. 1, a vessel 11 contains a solution 12 consisting of a solvent containing atomic nuclei having a magnetic moment and an angular momentum both different from zero, in particular protons, and of a free radical of hyperfine structure (dissolved in this solvent) comprising a nitroxide group the nitrogen atom of which is, one the other hand, linked exclusively to two carbon atoms each linked to three other carbon atoms.

An electronic resonance line of the radical of solution 12 contained in vessel 11 is saturated, as in the embodiment of FIG. 1, by means of a generator 13 delivering into at least a coil 14 having a small number of turns (only one of which has been shown), electrical oscillations at the electronic resonance frequency of said radical in such manner as to create, in vessel 11, an alternating magnetic field $H_1$ at the electronic resonance frequency $f$.

As in the embodiment of FIG. 1, saturation of electronic resonance line causes tipping of the electronic spins, which pass from their lower energy level to their upper energy level. The coupling between the electronic spins of free radical and the nuclear spins of the solvent involves, as in said first embodiment, a tipping of the nuclear spins of the solvent. However, in the embodiment of FIG. 2, as the sign of the coupling is different, the tipping of the nuclear spins no longer takes place from a higher energy level to a lower energy level but in the contrary from a lower energy level to a higher energy level. After such a tipping by dynamic polarization, the nuclear spins may return to the lower energy level, emitting, by stimulated emission of energy, energy at the nuclear resonance frequency. This energy is collected in a coil 17 disposed around vessel 11 and separated from coil 14 by a screen, of a known type, permeable to the electromagnetic radiation at the nuclear frequency F, but non-permeable to the electromagnetic radiation at the electronic frequency $f$, this screen (not shown) surrounding vessel 11, coil 17 being wound about this screen. In coil 17 there is thus created an electromotive force at the nuclear resonance frequency, or Larmor frequency, F which is close to 2100 cycles per second for protons in the earth magnetic field. Coil 17 forms, together with a variable capacitor 18, an oscillatory circuit adapted to be tuned to the nuclear resonance frequency F and having a Q factor sufficiently high to maintain oscillations at said frequency F. These oscillations are amplified by means of a preamplifier 19a the reaction of which is adjustable by means of potentiometer 18a (this reaction permitting further to increase the Q factor) and of an amplifier 19b, before being measured by a frequency meter 20.

In FIG. 3 we have shown an induction magnetometer of the type described in Belgian Patent No. 605,469, delivered July 14, 1961. In this third embodiment, as in the preceding ones, there is provided a vessel 21 containing a solution 22 consisting of a solvent having atomic nuclei the magnetic moment and angular momentum of which are both different from zero, in particular protons, and a free radical having a hyperfine structure, comprising a nitroxide group the nitrogen of which is, on the other hand, linked exclusively to two carbon atoms each linked to three other carbon atoms, and also an oscillator 23 at the frequency $f$ of one of the electronic resonance lines of this radical and a coil 24 fed from this oscillator 23, through a coaxial cable 25 and an adaptation network 26, including capacitor 26a, to saturate an electronic resonance line of said hyperfine structure radical. In this type of magnetometer, the electronic spins are, during a first step, given a direction substantially perpendicular to the direction of the magnetic field H to be measured by means of a coil 27 to which is applied, by means of a coaxial cable 27a, through an electronic switch 28, a voltage, generally constant, from a generator 28a, this voltage producing by means of coil 27, a magnetic field $H_0$, generally unidirectional, directed substantially at right angles to the magnetic field H. The intensity of this magnetic field $H_0$ is for instance equal to twice or three times that of the magnetic field H to be measured. The duration of application of $H_0$ may be reduced (as explained in the above mentioned Belgian patent) to about one millisecond due to the fact that polarization of the nuclear spins of the solvent is performed essentially by system 23, 24, the auxiliary magnetic field $H_0$ having essentially for its effect to give the protons or other nuclei a direction perpendicular to H. Then, the auxiliary magnetic field $H_0$ is suddenly cancelled, switch 28 disconnecting generator 28a and now connecting coil 27 through coaxial lines 27a, 27b with an amplifier 29 tuned by means of a capacitor 29a to the nuclear resonance frequency F in the magnetic field to be measured (this frequency averaging 2100 cycles per second for protons in the earth magnetic field). The frequency of the oscillations amplified by amplifier 29 is measured in a frequency meter 30, for instance of the decade type, for a duration which is either of the order of some seconds or of that of a portion of a second when use is made of the spin synchronizing device described in the French patent application No. P.V. 918,271, filed December 11, 1962. In order to simplify FIG. 3, the separation screen between coils 24 and 27, similar to the screen of the magnetometer of FIG. 2, has not been shown.

In FIG. 4, we have shown a spin generator magnetometer. In this embodiment also, a vessel 31 contains a solution 32 consisting of a solvent with atomic nuclei having a magnetic moment and an angular momentum both different from zero and of a free radical dissolved in this solvent, this radical comprising a nitroxide group the nitrogen atom of which is, on the other hand, linked exclusively to two carbon atoms each linked to three other carbon atoms.

Solution 32 contained in vessel 31 is subjected to an electromagnetic field at the electronic resonance frequency $f$ created by a coil 34 connected through a coaxial cable 35 with an electric generator or oscillator 33 oscillating at frequency $f$. Furthermore, vessel 31 is surrounded by coils 37a and 37b, each connected at its middle point 37c, 37d to the earth and respectively comprising 6000 and 200 turns, for instance. Between these coils 37a, 37b on the one hand, and coil 34 on the other hand, there is provided an electric screen of a known type, coil 34 being disposed on the inside of the screen, whereas coils 37a and 37b are on the outside thereof. This screen must be practically impermeable to the electromagnetic radiation at the electronic resonance frequency $f$ of the radical but permeable to the electromagnetic radiation at the nuclear frequency of the solvent, for instance 2100 cycles per second. To clarify the drawing, coils 37a and 37b have been shown at a distance from vessel 31 and the screen has not been shown.

Coil 37a, called receiver or measurement coil, is connected to an amplifier 39 without phase distortion and of very high gain, for instance of the order of 70 decibels, which is intended to produce, through resistor 39a of very high value (averaging 100,000 ohms), in coil 37b called emitting or excitation coil, a current exactly in phase with the voltage across the terminals of measurement coil 37a. The axes XX, YY of coils 37a and 37b make with each other, respectively, an angle of 90° so as to produce an electric uncoupling between these two coils. The residual coupling is made minimum by means of a balancing device consisting of a potentiometer 39b of, for instance, 25,000 ohms. Thus, only the resonance coupling (at the nuclear magnetic resonance) may serve to couple coils 37a and 37b. Consequently, in the absence of resonance, no current flows through amplifier 39. On the contrary, when there is in coil 37a a nuclear induction alternating electromotive force, this force is strongly amplified by amplifier 39, then applied to coil 37b, which creates a magnetic field to ensure the permanency of this electromotive force. We thus maintain oscillations at the Larmor frequency in circuits 37a, 39, 39a, 39b, coil 37a being tuned to this frequency by a capacitor 37e. It will be noted that, contrary to what takes place in the embodiment of FIG. 2, the circuit formed by coil 37a and capacitor 37e has a low Q coefficient, for instance equal to 6, which has the advantage of enabling the nuclear oscillator made according to this embodiment to work on the exact value of the nuclear resonance within a wide range of frequencies, that is to say of intensities of the magnetic field to be measured. A frequency meter 40 permits of measuring the frequency of the voltage amplified by amplifier 39, the output signal of frequency meter 40 being applied to a recording device 40a which directly inscribes the value of the intensity of the magnetic field H.

Details on the structure of the magnetometers of FIGS. 1 to 3 are given in the above mentioned patents, some details of construction disclosed in these patents applying also to the magnetometer of FIG. 4. As for frequency meter 20, 30 or 40, it may be advantageously of the type described in the French Patent No. 1,303,504, delivered August 6, 1962.

The essential characteristic of the magnetometers according to FIGS. 1 to 4 is that the free radical brought into play in the dissolved state in the vessel 1, 11, 21 or 31 always comprises a nitroxide group the nitrogen atom of which is, on the other hand, exclusively linked to two carbon atoms each linked to three carbon atoms.

It will be noted that these radicals (which have, in a high value magnetic field, three equidistant resonance lines) have in a low value field (lower than about 10 gauss) only two electronic resonance lines, saturation of the lower frequency line involving a decrease of energy of the nuclei of the solvent, which permits of devising absorption magnetometers (for instance of the type illustrated by FIG. 1), whereas saturation of the electronic resonance line of higher frequency produces the passage of the nuclei from a lower energy state to a higher energy state, return to the lower state being obtained by the stimulated emission of energy in a maser magnetometer (for instance of the type illustrated by FIG. 2). Consequently, in the magnetometers according to FIG. 1, oscillator 3 works at the lower of the two electronic frequencies of every radical which will be hereinafter indicated in Examples 1 to 9, whereas, in magnetometers according to FIG. 2, oscillator 13 delivers electrical oscillations at the higher of the two electronic resonance frequencies of every radical. Likewise, it is advantageous, in the magnetometers of FIGS. 3 and 4, to make use of a generator 23 or 33 working at the higher electronic frequency of the radicals according to the invention.

*Example I*

In a first example, solution 2, 12, 22 or 32 is constituted, in particular in the embodiment of FIG. 4, by 150 ml. of cyclohexane wherein have been dissolved 90 mg. of ditertiobutylnitroxide, $NO[C(CCH_3)_3]_2$ advantageously deoxygenated in the following manner.

The vessel that contained the solution was dipped in liquid nitrogen and, after solidification, connected to a vacuum pump lowering the pressure to a value of the order of the hundredth of a pascal (1 atmosphere=101,325 pascals). After one hour, the vessel was removed from the liquid nitrogen reservoir, in such manner as to produce a gradual elevation of temperature. As soon as bubbles appeared, the valve ensuring the communication with the vacuum pump was closed. When the solution was again entirely liquid, the vessel was again dipped in liquid nitrogen. This cycle of operation was repeated ten times.

Such a radical is perfectly suitable because in a low field (lower than about 10 gauss), it has two equidistant lines the respective frequencies of these lines being 62.5 and 65.2 mHz. in the earth magnetic field. This radical is wholly organic and it is consequently soluble in hydrocarbons, alcohols and most of the organic solvents, whereas peroxylamine disulfonate is soluble only in water. In organic solvents such as benzene for instance, the times of relaxation of the protrons are much greater than in water, which permits, in some cases, of merely performing a weaker polarization of the protons. On the other hand, the chemical stability of ditertiobutylnitroxide permits of using it at temperatures well above ordinary temperature, in conditions where peroxylamine disulfonate could not be used. Practically, the problem of the stability of ditertiobutylnitroxide does not exist in any of the actual conditions of use thereof according to the invention.

In view of the fact that both of the electronic resonance lines of this radical are relatively wide when the solution is not completely deoxygenated and that these lines, which correspond to inverse polarizations of the nuclei of the solvent, overlap slightly on each other, it is advantageous to proceed, as above stated, to as complete a deoxygenation of the solution of the radical as possible.

*Example II*

A second example consists in triacetonamine nitroxide $NO[C(CH_3)_2\text{—}CH_2]_2CO$, or tetramethyl - 2-2-6-6-aza-1-cyclohexanone-3-nitroxide-1. This radical has, in a low value field, two electronic resonance lines the frequencies of these lines in the earth field being equal to $68.2\pm0.6$ and $66.5\pm0.6$ mHz., whereas, in zero field, the resonance frequency is $67.36\pm-0.6$ mHz.

This radical, being wholly organic, is soluble in water, hydrocarbons, alcohols and most of the organic solvents, whereas (as above indicated) peroxylamine disulfonate is soluble only in water. This great solubility permits of using solvents containing but a little amount of oxygen dissolved, such as the water and glycol mixtures which are particularly suitable for dynamic polarization at low temperature ($-30°$ C.).

On the other hand, the higher chemical stability of this radical permits of using it at temperatures higher than ordinary temperature, in conditions where peroxylamine disulfonate could not be used.

It is possible to use, as solution 2, 12, 22 or 32 in the magnetometers of FIGS. 1 to 4, in particular in that of FIG. 4, a very little concentrated solution of this radical in solvents or mixtures of solvents having a low percentage of free oxygen, such as water, water and glycol, water and acetone, deoxygenated benzene. Thus, it is possible to use a solution in water at a concentration equal to ⅓₀₀ mole.

The radical of Example II may be advantageously used in the magnetometer of FIG. 4 in the form of a solution diluted in water, oscillator 33 oscillating at 68 mHz.

*Examples III to VI*

It is also possible to choose, as free radical, according to the invention, an organic free radical comprising a pentagonal heterocycle the heteroatom of which is a nitrogen atom linked, on the one hand, with an oxygen atom with which it forms a nitroxide group and, on the other hand, exclusively to the two carbon atoms that are adjacent thereto in the pentagonal cycle, each of these two carbon atoms being itself linked to three other carbon atoms, the sixteen other valences of the carbon atoms of the pentagonal cycle linking them to atoms or groups which may be of highly various types.

We may in particular use (Example III) tetramethyl-2-2-5-5-aza-1-cyclopentene-3-carboxamide - 3 - oxide - 1, which will be hereinafter called "Tanam-5," the formula of which is

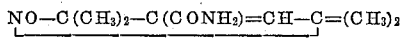
$NO\text{—}C(CH_3)_2\text{—}C(CONH_2)\text{=}CH\text{—}C\text{=}(CH_3)_2$ This last mentioned radical has, in a low value field and in solution in water, two lines which may be used for carrying out the present invention, the respective frequencies of these lines being 69±1 and 65.8±0.5 mHz. in the earth magnetic field.

Like the radicals of Examples I and II, this radical, being wholly organic, is soluble in water, as well as in hydrocarbons, alcohols and most of the organic solvents, whereas peroxylamine disulfonate is soluble only in water. As in the case of Example II, it is advantageous to use, for this radical, a solvent wherein the amount of oxygen that is dissolved is small, for instance a mixture of water and glycol which may be used for dynamic polarization at low temperature (−30° C.).

On the other hand, the chemical stability of the radical of Example III permits of using it at temperatures higher than ordinary temperature, in conditions where peroxylamine disulfonate could not be used. For practical purposes, the problem of its stability does not arise in the actual conditions of use.

Use is generally made of this radical in solution with a very low concentration in solvents or mixtures of solvents containing a small percentage of free oxygen of the above mentioned type (water-glycol, water-acetone, deoxygenated benzene, etc.) so as to avoid that saturation of one of the above mentioned lines, which involves a polarization of the protons in a given direction, be obtained with a partial saturation of the other line, which would produce a polarization of the protons in the opposed direction.

We may also bring into play, as pentagonal cycle compounds, one of the following components:

Tetramethyl-2-2-5-5-aza-1-cyclopentane-3-oxide-1, called "Tanane-5" (Example IV), the formula of which is

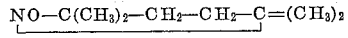

NO—C(CH₃)₂—CH₂—CH₂—C=(CH₃)₂

Tetramethyl-2-2-5-5-aza-1-cyclopentanol-3-oxide-1, called "Tanol-5" (Example V), the formula of which is

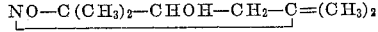

NO—C(CH₃)₂—CHOH—CH₂—C=(CH₃)₂

Tetramethyl-2-2-5-5-aza-1-cyclopentanone-3-oxide-1, called "Tano-5" (Example VI), the formula of which is

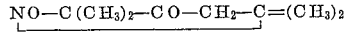

NO—C(CH₃)₂—CO—CH₂—C=(CH₃)₂

The frequencies of their electronic resonance lines are, in the earth field, respectively 69.3 and 67.3 mHz.±0.5; 68.2 and 66.2 mHz.±0.5
66.5 and 64.5 mHz.±0.5

*Examples VII to IX*

In order to carry out the invention, we may also make use of a solution of a free radical constituted by a hexagonal heterocycle the heteroatom of which is a nitrogen atom linked, on the one hand, to an oxygen atom with which it forms a nitroxide group and, on the other hand, exclusively with two carbon atoms, adjacent thereto in the hexagonal cycle, each of these two carbon atoms bearing, on the other hand, two methyl groups.

As a matter of fact, same as the radicals of Examples III to VI, these hexagonal cycle free radicals are wholly organic, therefore soluble in water, hydrocarbons, alcohols and most of organic solvents. This great solubility permits of using solvents wherein the amount of dissolved oxygen is low, in particular water-glycol mixtures may be used for dynamic polarization at low temperature (−30° C.).

On the other hand, their chemical stability permits of using them at temperatures higher than ordinary temperature. For practical purposes, the problem of their stability does not arise in any of the actual conditions of use.

As for the efficiency of the saturation of the electronic resonance, it is obtained, as for the preceding radicals, by using a sufficiently small concentration of the hexagonal cycle radical, which further permits of not widening too much the nuclear lines, and by dissolving the hexagonal cycle radical in solvents or mixtures of solvents containing a low percentage of free oxygen such as water, water-glycol, water-acetone, deoxygenated benzene, etc. Owing to these precautions, it is possible to avoid that saturation in a weak field of one of the electronic resonance lines, which causes a polarization of the protons or other atomic nuclei of the solvent in a given direction, be accompanied by a partial saturation of the other line which would produce a polarization of the protons or other nuclei in the opposed direction.

The structure of the hyperfine spectrum of these hexagonal cycle radicals is perfectly well adapted to the use of the invention, because the unpaired electron of such a radical is linked only to the nitrogen nucleus and is separated by at least three links from any atom the nucleus of which would have a spin, therefore a magnetic moment, which would complicate this structure by coupling with this electron. It will be noted that all the compounds according to the invention have such a favorable chemical formula.

By way of example of such hexagonal cycle free radicals, we may cite:

Tetramethyl-2-2-6-6-aza-1-cyclohexanol-4-oxide-1, called "Tanol-6" (Example VII), the chemical formula of which is

NO[C(CH₃)₂—CH₂]₂CHOH

Tetramethyl-2-2-6-6-aza-1-cyclohexane-4-oxide-1, called "Tanane-6" (Example VIII), the formula of which is

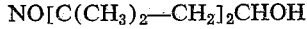

NO[C—CH₃)₂—CH₂]₂CH₂ and

Tetramethyl-2-2-6-6-aza-1-cyclohexanoneoxime-4-oxide-1, called "Tanoxime-6" (Example IX), the formula of which is

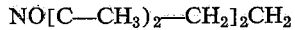

NO[C(CH₃)₂—CH₂]C=NOH in addition to the radical according to Example II.

The following table gives, for each of the radicals of Examples VII, VIII and IX, the values of the two paramagnetic resonance frequencies measured in the earth field with a solution of the radical in pure water, and the frequency chosen for oscillator 33 (or 13 or 23) feeding coil 34 (or 14 or 24) coupled with vessel 31 (or 11 or 21) containing 150 cm.³ of a millinormal solution of the radical in water to which has been added one third of glycol. These frequencies are given with a precision of about 0.5 mHz.

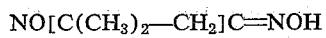

|  | Resonance frequencies in pure water, mHz. | Frequency of generator 34 for a mixture of ⅔ of water and ⅓ of glycol, mHz. |
| --- | --- | --- |
| Tanol-6 | 69.5 and 74.5 | 73.5 |
| Tanane-6 | 71 and 75 | 74 |
| Tanoxime-6 | 68 and 70 | 69 |

It will be noted that the electronic paramagnetic resonance frequencies, in a weak field, of the radicals according to the invention, vary slightly with the solvent.

The following table indicates these frequencies, for instance in the case of triacetonamine nitroxide (Example II), according to the solvent supposed to be pure:

Water _____ 66.5 and 69 mHz. (±0.5).
(Ethylene) glycol _____ 63.5 and 66 mHz. (±0.5).
Diethylene glycol _____ 62 and 65 mHz. (±0.5).

It will be noted that it is of interest to use all the free radicals according to the invention in diluted and deoxygenated solutions (in particular in solution in a mixture of about two parts of water with about one part of glycol). Suitable concentrations of the radical range, for instance, from 0.005 to 0.0005 approximately (in particular about 0.001). Free oxygen concentration is about 0.1 in volume.

Among the free radicals which may be mentioned by way of non-limitative examples:

Some were already known and we have used, for obtaining them, a known method of preparation;

Others, although known and capable of being prepared by a known method, were obtained by us by a more advantageous new method of preparation, Finally, some were discovered and prepared for the first time by us.

Thus, ditertiobutylnitroxide (Example I) was prepared by the method indicated by K. Hoffmann in the November 1961 issue of the "Journal of American Chemical Society," pages 4671 and 4672, to wit the alcaline reduction of t-nitrobutane.

Triacetonamine nitroxide or tetramethyl-2-2-6-6-aza-1-cyclohexanone-3-nitroxide-1 of Example II, a method of preparation of which was indicated by M. B. Neiman, E. G. Rozantzev, Yu G. Mamedova (Nature, November 3, 1962, volume 196, pages 472–4), to wit oxidation of triacetonamine by hydrogen peroxide, in the presence of a molybdenum, tungsten or vanadium salt, separation of the radical being effected by chromatography on alumina, was prepared by us through a new method based on the non-basicity of the nitroxide radical. This new method of preparation is as follows:

20 g. of triacetonamine were dissolved in 100 ml. of distilled water. We added 10 mg. of phosphotungstic acid acting as catalyst and 24 ml. of 110 volumes hydrogen peroxide, which corresponds to the number of oxygen equivalents necessary for oxidation. The whole was allowed to react for 30 minutes at ordinary temperature, then the solution was saturated with sodium chloride until a colored upper layer appeared.

Extraction by means of ether made it possible to separate the aqueous phase from the red ether containing phase. The latter was then washed several times with normal sulfuric acid which drove out the triacetonamine that had not reacted. The non-basic radical remained in the ether containing phase which was washed with a saturated solution of sodium chloride, then dried on anhydrous sodium sulfate.

Evaporation in a vacuum of the ether permitted of subsequently obtaining 8 g. of a paramagnetic brownish solid substance: pure triacetonamine nitroxide, melting at 25°–36° C. in a capillary tube.

Tanam-5 was prepared by us by oxidation by means of hydrogen peroxide of the corresponding amine, tetramethyl-2-2-5-5-aza-1-cyclopentene-3-carboxamide-3:

phosphotungstic acid being used as catalyst.

For this purpose, 1 g. of this amine was dissolved in 5 ml. of distilled water. 10 mg. of phosphotungstic acid were added, then 1.2 ml. of 110 volumes (30%) hydrogen peroxide, drop by drop (this corresponding to a slightly excess, as only 1 ml. was necessary for oxidation).

The colorless liquor then became of clear green color. The mixture was magnetically stirred for 12 hours and we obtained:

A precipitate: 600 mg. of a mixture of yellow crystals and of a white powder, the melting point of this mixture being 209° C., and A mother solution.

It is possible to obtain Tanam-5 (yellow crystals) in various manners:

300 mg. of the above precipitate are washed in water on a Büchner flask, under vacuum, so that the initial amine, more soluble in water, is dissolved; 200 mg. of yellow crystals having a melting point of 211° C. then remain;

The other 300 mg. of said precipitate are recrystallized in water so as to give 170 mg. of yellow crystals having a melting point of 208° C. and a filtrate which produces, within a period of three weeks, 120 mg. of yellow needles having a melting point of 212° C.;

Likewise, the mother solution gives, within fifteen days, 180 mg. of yellow needles having a melting point of 212° C.

The radical (yellow crystals), relatively little soluble in water, crystallizes in well definite manner, in the aqueous filtrates, when these filtrates are concentrated.

Identity between two of the crystals, the melting point of which is 212° C., and Tanam-5 (Example III) was checked up by microanalysis.

Tanane-5 (Example IV), Tanol-5 (Example V) and Tano-5 (Example VI) were prepared in a similar manner from the corresponding amine.

Among the hexagonal cycle radicals, the easiest to be obtained are those which comprise a symmetrical heterocycle variously substituted on the carbon atom symmetrically opposed, in the cycle, to the heteroatom, the simplest method being oxidation of the corresponding amine, when it is available, by hydrogen peroxide, in the presence of a catalyst such as phosphotungstic acid. The developed formula of the symmetrical radicals is as follows:

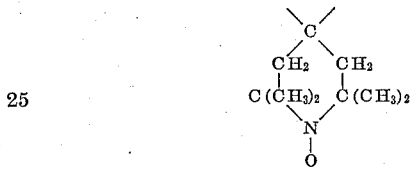

However, it is quite evident that substitution of a hydrogen atom of a methylene group by an atom, for instance of bromine, which substitution is easy to perform, would lead to non-symmetrical heterocycles the properties of which would also comply with the above mentioned conditions.

By way of examples of preparation, we will indicate the following methods:

The first one relates to the tetramethyl-2-2-6-6-aza-1-cyclohexanol-4-oxide-1 of Example VII, discovered and called by us "Tanol-6." Its preparation, according to the above indicated general method, is as follows:

The corresponding amine, tetramethyl-2-2-6-6-azo-1-cyclohexanol-4, already known, was prepared by reduction, by means of lithium aluminohydride (LiAlH$_4$), of triacetonamine in an anhydrous ether medium.

Triacetonamine must be previously dried. For this purpose, a solution of 10 g. of triacetonamine is distilled in 20 ml. of benzene: the azeotrope carries along the remaining water.

In a flask of the Erlenmeyer type, containing 2.45 g. of lithium aluminohydride in 100 ml. of anhydrous ether, we add, drop by drop, by means of a bromine bulb, a solution of 10 g. of dried triacetonamine in 100 ml. of anhydrous ether. The solution is magnetically stirred for six hours and constantly cooled in an ice bath. Excess of hydride is destroyed by the successive addition of 2.45 ml. of water,
2.45 ml. of soda of 15% strength,
7.35 ml. of water.

The aluminate which is formed is filtered under vacuum on a flask of the Büchner type. The ether solution evaporated in a vacuum gives 4 g. of yellowish crystals having a melting point of 133° C. The yield is 40%.

These crystals are purified by sublimation in a vacuum. The melting point reaches 134°–135° C.

Saturation with sodium chloride is effected. An extraction by means of ether with ordinary washings gives, after evaporation of the ether phase, 1.8 g. of reddish crystals having a melting point of 65° C. The crystals redissolved in ether give a solution which is washed successively with a solution of normal sulfuric acid in order to eliminate the excess of amine used as starting material, then with distilled water saturated with sodium chloride, and passed on anhydrous sodium sulfate. We then obtain 550 mg. of paramagnetic orange color crystals having a melting point of 68° C. They may be recrystallized in petroleum ether. Their melting point then reaches 70° C.

In order to obtain a better degree of purity, these crystals are sublimated in a vacuum. Their melting point then reaches 71° C. (pure Tanol-6).

The second method relates to the preparation of tetramethyl-2-2-6-6-aza-1-cyclohexane-4-oxide-1, a radical which is already known and which was called "Tanane-6" (Example VIII).

This radical, which was already prepared by M. B. Neiman, E. G. Rozantzev and Yu G. Mamedova, may also be prepared, and this in a more advantageous manner, by transforming triacetonamine, according to the known reaction called Wolff-Kishner reaction described in particular in the book of A. I. Vogel: "Practical Organic Chemistry," pages 510 and 511 of the third edition (Longmans, editor, in London). The new amine that is obtained is then oxidized by hydrogen peroxide in the presence of phosphotungstic acid as already indicated.

The third preparation that is indicated relates to tetramethyl-2-2-6-6-aza-1-cyclohexanoneoxime-4-oxide-1, a compound which is already known and has been called by us "Tanoxime-6" (Example IX).

This body was already prepared by M. B. Neiman, E. G. Rozantzev and Yu G. Mamedova by the action of hydroxylamine on triacetonamine nitroxide (Nature, volume 196, of November 3, 1962, pages 472–4). But its preparation may also be effected according to the following method which we have perfected.

Hydroxylamine is made to act upon phorone, the formula of which is $$C(CH_3)_2\text{—}CHCOCHC(CH_3)_2$$

and basic Tanoxime is separated by washing with sulfuric acid. The tanoxime salt passes into the aqueous phase. This phase is separated and saturated with potash. Tanoxime is finally extracted by means of ether.

To finish, it will be noted that, in all the free radicals entering into the scope of the general formula

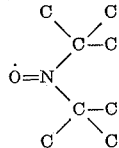

and in particular in those given by way of example, the unpaired electron is coupled only with a nitrogen nucleus, and that is is separated by at least three links from any atom the nucleus of which would have a magnetic moment different from zero (for instance from an hydrogen atom linked to one of the carbon atoms of the above formula). It is in order to comply with this requirement that the two carbon atoms linked to the nitrogen atom must be tertiary carbons (that is to say exclusively linked to carbon atoms). As a matter of fact, it is known that the nucleus of carbon 12 has no magnetic moment because it has an even number of protons and an even number of neutrons.

On the other hand, it will be noted that, as a rule, the compounds according to the invention may be prepared by oxidation of the corresponding amines by hydrogen peroxide in the presence of phosphotungstic acid acting as catalyst.

Finally, all the free radicals comprised in the above general formula are chemically stable, even at temperatures above 40° C., and soluble in most of the organic solvents and in water, and also in mixtures of these solvents. It is always advantageous to use for carrying out the invention a deoxygenated solution of these radicals. As for the magnetic properties of these radicals, they are perfectly suitable for performing dynamic polarization of the nuclei of a solvent, in particular a hydrogenated one, especially in a magnetometer having a double resonance:

An electronic resonance of the radical,

A nuclear resonance of the solvent nuclei, energy at the electronic resonance frequency being applied to polarize the electrons of the radical and thus to produce, by dipolar coupling, a tipping of the nuclear spins, from which results an increase of the intensity of the signal at the nuclear resonance frequency which is determined by a frequency meter or the like, this nuclear frequency being strictly proportional to the intensity of the magnetic field in which the solution of said radical is placed. To sum up, these magnetic properties of the radicals according to the invention are:

A hyperfine gap, that is to say a resonance frequency in a zero magnetic field sufficiently high to ensure a satisfactory polarization, the polarization that is obtained for the nuclei of the solvent being proportional to this hyperfine gap, A hyperfine spectrum structure compatible with an efficient saturation of the useful line of electronic resonance, and A dipolar coupling between the spins of the unpaired electrons and the spins of the nuclei of the solvent.

In a general manner, while we have in the above description disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. In a magnetometer for measuring the earth magnetic field and its variations, of the type including a solution which comprises a solvent with atomic nuclei having non-zero magnetic moment and, dissolved in said solvent, a free radical having unpaired electrons, the improvement consisting in constituting said free radical by an organic free radical comprising a nitroxide group, the nitrogen atom of which is further exclusively linked to two carbon atoms each linked with three other carbon atoms.

2. The improvement according to claim 1 wherein said radical is ditertiobutylnitroxide.

3. The improvement according to claim 1 wherein said radical includes a pentagonal heterocycle the heteroatom of which is nitrogen and is linked, on the one hand, with an oxygen atom with which it constitutes a nitroxide group and, on the other hand, exclusively with the two carbon atoms that are adjacent thereto in the pentagonal cycle, each of these two carbon atoms being linked on the other hand with three other carbon atoms.

4. The improvement according to claim 3 wherein the radical having a pentagonal heterocycle is tetramethyl-2-2-5-5-aza-1-cyclopentene-3-carboxamide-3-oxide-1.

5. The improvement according to claim 3 wherein the radical having a pentagonal heterocycle is tetramethyl 2-2-5-5-aza-1-cyclopentane-3-oxide-1.

6. The improvement according to claim 3 wherein the radical having a pentagonal heterocycle is tetramethyl-2-2-5-5-aza-1-cyclopentanol-3-oxide 1.

7. The improvement according to claim 3 wherein the radical having a pentagonal heterocycle is tetramethyl-2-2-5-5-aza-1-cyclopentanone-3-oxide 1.

8. The improvement according to claim 1, wherein said radical includes a hexagonal heterocycle the heteroatom of which is nitrogen and is linked, on the one hand, to an oxygen atom with which it constitutes a nitroxide group and, on the other hand, exclusively with the two carbon atoms adjacent thereto in the hexagonal cycle, each of these two carbon atoms being linked on the other hand with two methyl groups.

9. The improvement according to claim 8 wherein the hexagonal heterocycle radical is tetramethyl-2-2-6-6-aza-1-cyclohexanone-3-nitroxide 1.

10. The improvement according to claim 8 wherein the hexagonal heterocycle radical is tetramethyl-2-2-6-6-aza-1-cyclohexanol-4-oxide-1.

11. The improvement according to claim 8 wherein the hexagonal heterocycle radical is tetramethyl-2-2-6-6-aza-1-cyclohexane-4-oxide-1.

12. The improvement according to claim 8 wherein the hexagonal heterocycle radical is tetramethyl-2-2-6-6-aza-1-cyclohexanoneoxime-4-oxide 1.

13. The improvement according to claim 2 wherein said solvent is a hydrogenated solvent in which said nuclei are protons and the solution is very diluted and deoxygenated.

14. A magnetometer for measuring the intensity of weak magnetic fields comprising a vessel which contains on the one hand a solvent with magnetic nuclei having an angular momentum and a magnetic moment both different from zero and on the other hand, dissolved in said solvent, a free radical having unpaired electrons, of hyperfine spectral structure with at least one electronic resonance line of non-zero frequency in a zero magnetic field, saturation means for saturating such an electronic resonance line in the magnetic field to be measured, and means for determining the resonance frequency of said atomic nuclei in the magnetic field to be measured when said saturation means actually saturate said electronic resonance line, said nuclear resonance frequency being exactly proportional to the intensity of the magnetic field, said free radical comprising a nitroxide group the nitrogen atom of which is on the other hand exclusively linked with two carbon atoms each linked with three other carbon atoms.

15. A magnetometer according to claim 14 wherein, said radical having two electronic resonance lines in a weak field, said saturation means are adapted to saturate the electronic resonance line the resonance frequency of which is lower and said means for determining the frequency comprise means for modulating the intensity of the magnetic field to be measured and a Pound spectrometer for determining the frequency at which the absorption of energy by said atomic nuclei by means of the Pound spectrometer is maximum.

16. A magnetometer according to claim 14 wherein, said radical having two electronic resonance lines in a weak field, said saturation means saturate the electronic resonance line having the higher frequency of resonance and said means for determining the frequency comprise an oscillating circuit with a very high Q factor, tunable on the nuclear resonance frequency and comprising a coil which surrounds said vessel, and means for determining the frequency of the oscillations in said oscillating circuit.

17. A magnetometer according to claim 14 wherein said means for determining the frequency comprise means for directing, during predetermined periods, the magnetic moments of said atomic nuclei so that they make a substantial angle with the magnetic field to be measured and means for determining, after the end of each of these periods, the frequency of free precession of said magnetic moments.

18. A magnetometer according to claim 14 wherein said means for determining the frequency comprise at least two coils disposed about said vessel substantially with their axes perpendicular to each other, with a very high gain amplifier for connecting said coils to each other, and means for determining the frequency of the oscillations amplified by said amplifier.

19. A magnetometer according to claim 14 wherein said radical is ditertiobutylnitroxide.

20. A magnetometer according to claim 14 wherein said radical comprises a pentagonal heterocycle the heteroatom of which is nitrogen and is linked, on the one hand, with an oxygen atom with which it constitutes a nitroxide group and, on the other hand, exclusively with the two carbon atoms that are adjacent thereto in the pentagonal cycle, each of these two carbon atoms being linked on the other hand with three other carbon atoms.

21. A magnetometer according to claim 14 wherein said radical comprises a hexagonal heterocycle the heteroatom of which is nitrogen and is linked, on the one hand, with an oxygen atom with which it constitutes a nitroxide group and, on the other hand, exclusively with the two carbon atoms adjacent thereto in the hexagonal cycle, each of these two carbon atoms being linked on the other hand with two methyl groups.

22. A magnetometer according to claim 14 wherein said solvent is a hydrogenated solvent wherein said nuclei are protons and the solution is very much diluted and deoxygenated.

23. A magnetometer according to claim 22 wherein the solvent is a mixture of about two parts of water and one of glycol, the amount of radical in the solution averaging 0.001 mole/liter and the amount of free oxygen being less than 1/10 in volume.

References Cited by the Examiner

UNITED STATES PATENTS

| | | | |
|---|---|---|---|
| 3,049,662 | 8/1962 | Abragam et al. | 324—0.5 |
| 3,080,519 | 3/1963 | McCombrey et al. | 324—0.5 |
| 3,085,196 | 4/1963 | Martin | 324—0.5 |
| 3,133,243 | 5/1964 | Bonnet et al. | 324—0.5 |

OTHER REFERENCES

Castner, Physical Review, vol. 115, No. 6, Nov. 15, 1959, pages 1506–1515 incl.

Hoffman et al., Journal of the American Chemical Society, vol. 83, No. 22, Nov. 20, 1961, pages 4671, 4672, 4675, and 4676.

Gutowsky et al., The Journal of Chemical Physics, vol. 39, vol. 1, July 1, 1963, pages 208–217 incl.

Ingram, Free Radicals as Studied by Electron Spin Resonance, Butterworth's Scientific Publications, London 1958, pages 95, 96, and 97 principally relied upon.

CHESTER L. JUSTUS, *Primary Examiner.*

MAYNARD R. WILBUR, *Examiner.*